United States Patent
Hsuan et al.

(10) Patent No.: US 11,763,114 B2
(45) Date of Patent: Sep. 19, 2023

(54) SYSTEMS AND METHODS OF CONDUCTING A BAR CODE SCAN USING AN IMAGING-BASED BAR CODE SCAN DEVICE

(71) Applicant: Toshiba Global Commerce Solutions, Inc., Durham, NC (US)

(72) Inventors: Wei-Yi Hsuan, Taipei (TW); Yi-Sheng Lee, Taipei (TW); Te-Chia Tsai, Taipei (TW); Chih-Huang Wang, Taipei (TW)

(73) Assignee: TOSHIBA GLOBAL COMMERCE SOLUTIONS, INC., Durham, NC (US)

( * ) Notice: Subject to any disclaimer, the term of this patent is extended or adjusted under 35 U.S.C. 154(b) by 24 days.

(21) Appl. No.: 17/484,705

(22) Filed: Sep. 24, 2021

(65) Prior Publication Data
US 2023/0102818 A1 Mar. 30, 2023

(51) Int. Cl.
*G06K 7/14* (2006.01)
*G06K 7/10* (2006.01)

(52) U.S. Cl.
CPC ....... *G06K 7/1413* (2013.01); *G06K 7/10722* (2013.01)

(58) Field of Classification Search
CPC .......... G06K 7/10772; G06K 7/1413
USPC .................................................. 235/462.41
See application file for complete search history.

(56) References Cited

U.S. PATENT DOCUMENTS

| 8,087,587 B2 | 1/2012 | Vinogradov et al. |
| 2001/0055422 A1* | 12/2001 | Roustaei ............ G06K 7/10811 382/181 |

* cited by examiner

*Primary Examiner* — Toan C Ly
(74) *Attorney, Agent, or Firm* — Kaufman & Canoles, P.C.

(57) ABSTRACT

Systems and methods of conducting a bar code scan using an imaging-based bar code scan device are provided. In one exemplary embodiment, a method is performed by an imaging-based bar code device that includes processing circuitry, an optical lens assembly having an image sensor and an optical lens with a focused region at a certain distance in front of the optical lens along an optical axis of the optical lens, a plurality of light emitting elements configured proximate the optical lens and laterally offset from the optical axis. The method includes sending, by the processing circuitry, to each light emitting element, an indication to enable that light emitting element to project a light beam towards the optical axis in the focused region so that the light beams overlap when a target bar code is in the focused region and non-overlap when a target bar code is outside the focused region.

20 Claims, 5 Drawing Sheets

SYSTEMS AND METHODS OF CONDUCTING A BAR CODE SCAN USING AN IMAGING-BASED BAR CODE SCAN DEVICE

FIELD OF DISCLOSURE

The present disclosure relates generally to the field of bar code scanning, and in particular to systems and methods of conducting a bar code scan using an imaging-based bar code scan device.

BACKGROUND

Bar code scanners that scan and decode bar codes using imaging systems are commonly referred to as imaging-based bar code scan devices. These imaging systems typically include a modular optical lens (e.g., camera) assembly having an image sensor (e.g., charge coupled device (CCD) sensor, complementary metal oxide semiconductor (CMOS) sensor, or the like) and a lens assembly to focus the lens' field of view onto the image sensor. The optical lens assembly typically includes one or more light emitting diodes (LEDs) to illuminate the lens' field of view. In operation, light (including from the LEDs) is reflected from a target bar code within the lens' field of view and focused through the lens onto the image sensor, which captures a bar code image. Accordingly, there is a need for improved techniques for conducting a bar code scan using an imaging-based bar code scan device.

SUMMARY

The following presents a simplified summary of the disclosure in order to provide a basic understanding to those of skill in the art. This summary is not an extensive overview of the disclosure and is not intended to identify key/critical elements of embodiments of the disclosure or to delineate the scope of the disclosure. The sole purpose of this summary is to present some concepts disclosed herein in a simplified form as a prelude to the more detailed description that is presented later.

Briefly described, embodiment of the present disclosure relate to systems and methods of conducting a bar code scan using an imaging-based bar code scan device. According to one aspect, a method is performed by an imaging-based bar code device that includes processing circuitry, an optical lens assembly having an image sensor and an optical lens with a focused region at a certain distance in front of the optical lens along an optical axis of the optical lens, a plurality of light emitting elements configured proximate the optical lens and laterally offset from the optical axis. The method includes sending, by the processing circuitry, to each light emitting element, an indication to enable that light emitting element to project a light beam towards the optical axis in the focused region so that the light beams overlap when a target bar code is in the focused region and the light beams non-overlap when a target bar code is outside the focused region.

According to another aspect, the step of sending the indication to enable the light emitting elements is responsive to determining that an image captured by the image sensor through the optical lens includes an object positioned in a field of view of the optical lens.

According to another aspect, the step of sending the indication to enable the light emitting elements is responsive to determining that the object includes a barcode based on the captured image.

According to another aspect, the method further includes receiving, by the processing circuitry, from the image sensor, an image captured by the image sensor through the optical lens.

According to another aspect, an angle of the light beam projected by each light emitting element relative to the optical axis is based on a length of the focused region of the lens along the optical axis and a length between the focused region and the lens along the optical axis.

According to another aspect, the lateral distance of each light emitting element relative to the optical axis is based on a length of the focused region of the lens along the optical axis and a length between the focused region and the lens along the optical axis.

According to another aspect, a transverse cross section of the light beam for each light emitting element in the focused region has a diameter of no more than one centimeter.

According to another aspect, a transverse cross section of the light beam for each light emitting element in the focused region is the same.

According to another aspect, a luminosity of the light beam of each light emitting element in the focused region is the same.

According to another aspect, a shape of the light beam in the focused region is circular or ovular.

According to another aspect, a distance between the light beam projections on the bar code correspond to a distance between a current position of the bar code and the focused region along the optical axis.

According to another aspect, each light beam and the overlapped beam are different colors.

According to another aspect, a color of a first light beam is yellow, a color of a second light beam is red, and a color of the overlapped first and second light beams is green.

According to one aspect, an imaging-based bar code scan device comprises an optical lens assembly having an image sensor and an optical lens configured with a focused region at a certain distance in front of the optical lens along an optical axis of the optical lens, a plurality of light emitting elements configured proximate the optical lens and laterally offset from the optical axis, processing circuitry, and a memory. The memory comprises instructions executable by the processing circuitry whereby the processing circuitry is configured to send, to each light emitting element, an indication to enable that light emitting element to project a light beam towards the optical axis in the focused region so that the light beams overlap when a target bar code is in the focused region and the light beams non-overlap when a target bar code is outside the focused region.

BRIEF DESCRIPTION OF THE DRAWINGS

The present disclosure will now be described more fully hereinafter with reference to the accompanying drawings, in which embodiments of the disclosure are shown. However, this disclosure should not be construed as limited to the embodiments set forth herein. Rather, these embodiments are provided so that this disclosure will be thorough and complete, and will fully convey the scope of the disclosure to those skilled in the art. Like numbers refer to like elements throughout.

DETAILED DESCRIPTION

For simplicity and illustrative purposes, the present disclosure is described by referring mainly to an exemplary embodiment thereof. In the following description, numerous specific details are set forth in order to provide a thorough understanding of the present disclosure. However, it will be readily apparent to one of ordinary skill in the art that the present disclosure may be practiced without limitation to these specific details.

Currently, a portable imaging-based bar code scan device is held by a user and pointed at a target bar code to scan and decode that bar code. An aiming pattern is typically projected in the middle or center point of the lens' field of view so that the user can aim the scan device at the target bar code so that the target bar code is within the field of view of the scan device. Further, these portable scan devices are typically fixed-focused systems where the field of view and the focus region is fixed. The focus region is a distance in front of the lens for which a target bar code may be successfully captured by the image sensor and decoded by the imaging decoding circuitry. As such, a user of this portable scan device must move a target bar code relative to the device so that the target bar code is captured by the image sensor while in the lens' field of view and focus region for successful decoding of the target bar code. If the target bar code is captured outside the lens' field of view or focus region, then the image sensor will capture a blurry, distorted, or poor-quality image of the target bar code, likely resulting in the inability of the imaging decoding circuitry to decode the target bar code.

Accordingly, there is a need for improved techniques for conducting a bar code scan using an imaging-based bar code scan device so that the image sensor can capture an image of the target bar code while in the lens' field of view and focus region for successful decoding of the target bar code. In addition, other desirable features and characteristics of the present disclosure will become apparent from the subsequent detailed description and embodiments, taken in conjunction with the accompanying figures and the foregoing technical field and background.

Figure 1:
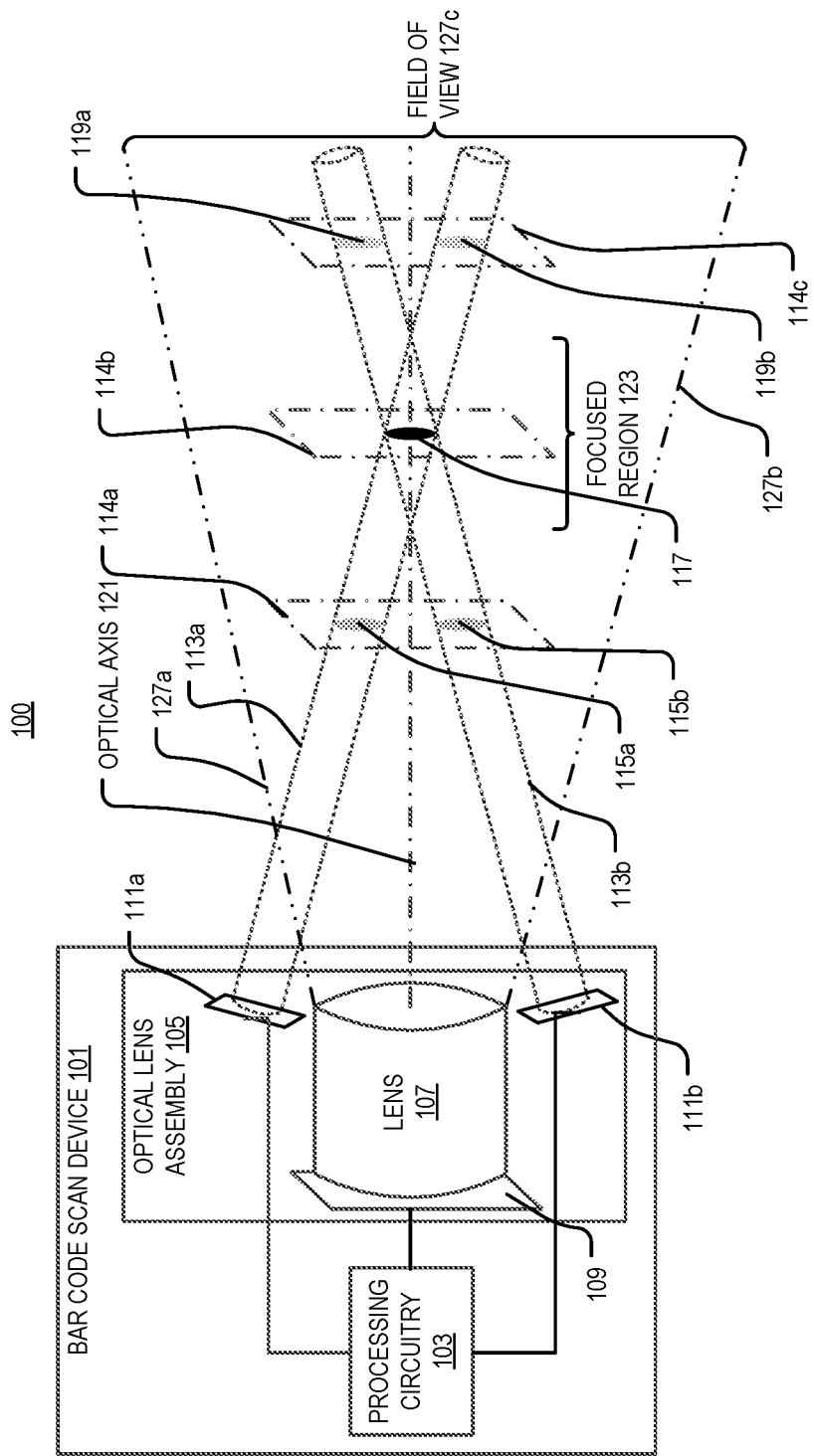
FIG. 1 illustrates one embodiment of a system of conducting a bar code scan using an imaging-based bar code scan device in accordance with various aspects as described herein.

In the present disclosure, systems and methods of conducting a bar code scan using an imaging-based bar code scan device are provided. In one example, FIG. 1 illustrates one embodiment of a system 100 of conducting a bar code scan using an imaging-based bar code scan device 101 in accordance with various aspects as described herein. In FIG. 1, the device 101 is configured to include processing circuitry 103 and an optical lens assembly 105. The optical lens assembly 105 is configured to include an optical lens 107 (e.g., variable focus lens, fixed focus lens, or the like), an image sensor 109 (e.g., CCD sensor, CMOS sensor, or the like), a plurality of light emitting elements 111a-b (e.g., LEDs, laser diodes, or the like), the like, or any combination thereof. The lens 107 is configured to have a field of view 127a-c and a focused region 123 along an optical axis 121. In one example, the lens 107 is a fixed-focused lens. Further, the focused region 123 is a certain distance (e.g., 30 cm, 50 cm, or the like) in front of the lens 107. The lens 107 is operable so that a target bar code captured by the image sensor 109 while in the lens' 107 field of view 127a-c and focus region 123 can be successfully decoded by imaging decoding circuitry operationally coupled to the processing circuitry 103.

In FIG. 1, the image sensor 109 is configured to be in alignment with the lens 107 so that the light receiving surface of the image sensor 109 orthogonally intersects with the optical axis 121. The light emitting elements 111a-b are configured proximate the lens 107 and laterally offset from the optical axis 121. Further, the angle of the light beam 113a-b projected by each light emitting element 111a-b relative to the optical axis 121 is based on the length of the focused region 123 along the optical axis 121 and the length between the focused region 123 and the lens 107 along the optical axis 121. Further, the lateral distance of each light emitting element 111a-b relative to the optical axis 121 is based on the length of the focused region 123 of the lens 107 along the optical axis 121 and the length between the focused region 123 and the lens 107 along the optical axis 121. The light emitting elements 111a-b are configured to project the light beams 113a-b towards the optical axis 121 in the focused region 123 so that the light beams 113a-b overlap 117 when a target bar code 114b is in the focused region 123 and the field of view 127a-c. Further, the light emitting elements 111a-b are configured to project the light beams 113a-b so that they are non-overlapped projections 115a-b, 119a-b on a target bar code 114a, 114c when that target bar code 114a, 114c is outside the focused region 123. The distance between the light beam projections 115a-b, 119a-b on the bar code 114a, 114c correspond to a distance between a current position of the bar code 114a, 114c and the focused region 123 along the optical axis 121.

In the current embodiment, the transverse cross section of the light beam 113a-b of each light emitting element 111a-b in the focused region 123 may have the same or different diameters. In one example, the light beam of each light emitting element 111a-b in the focused region 123 has a diameter of no more than one centimeter. Also, the shape of the light beam 113a-b of each light emitting element 111a-b may be the same or different. In one example, the shape of the light beam 113a-b of each light emitting element 111a-b is circular or ovular. In another example, the shape of the light beam 113a-b of one light emitting element 111a-b is a horizontal line and the light beam of another light emitting element 111a-b is a vertical line such that when the light beams overlap in the focused region 123 the shape of the overlapped beams is a plus symbol ('+'). Of course, this same concept can be applied in producing other shapes for the overlapped beams such as an 'x' symbol or the like.

In operation, the processing circuitry 103 may receive from the image sensor 109 an image captured by the image sensor 109 through the optical lens 107. The processing circuitry 103 may then determine whether the captured image is an object in the field of view 127a-c of the lens 107. In addition, the processing circuitry 103 may determine that the object represents a bar code. The processing circuitry 103 may include artificial intelligence or machine learning circuitry such as neural network circuitry that is configured to determine whether a captured image includes an object or whether a detected object represents a bar code. In response to detecting an object or determining that a detected object includes a bar code, the processing circuitry 103 determines to enable each light emitting element 111a-b to project a light beam 113a-b towards the optical axis 121 in the focused region 123 so that the light beams 113a-b overlap 117 when a target bar code 114b is in the focused region 123 and the light beams 113a-b non-overlap 115a-b, 119a-b when a target bar code 114a, 114c is outside the focused region 123. In response to determining to enable each light emitting element 111a-b, the processing circuitry 103 sends, to each light emitting element 111a-b, an indication to enable that light emitting element 111a-b to project the light beams 113a-b towards the optical axis 121 in the focused region 123.

Figure 2:
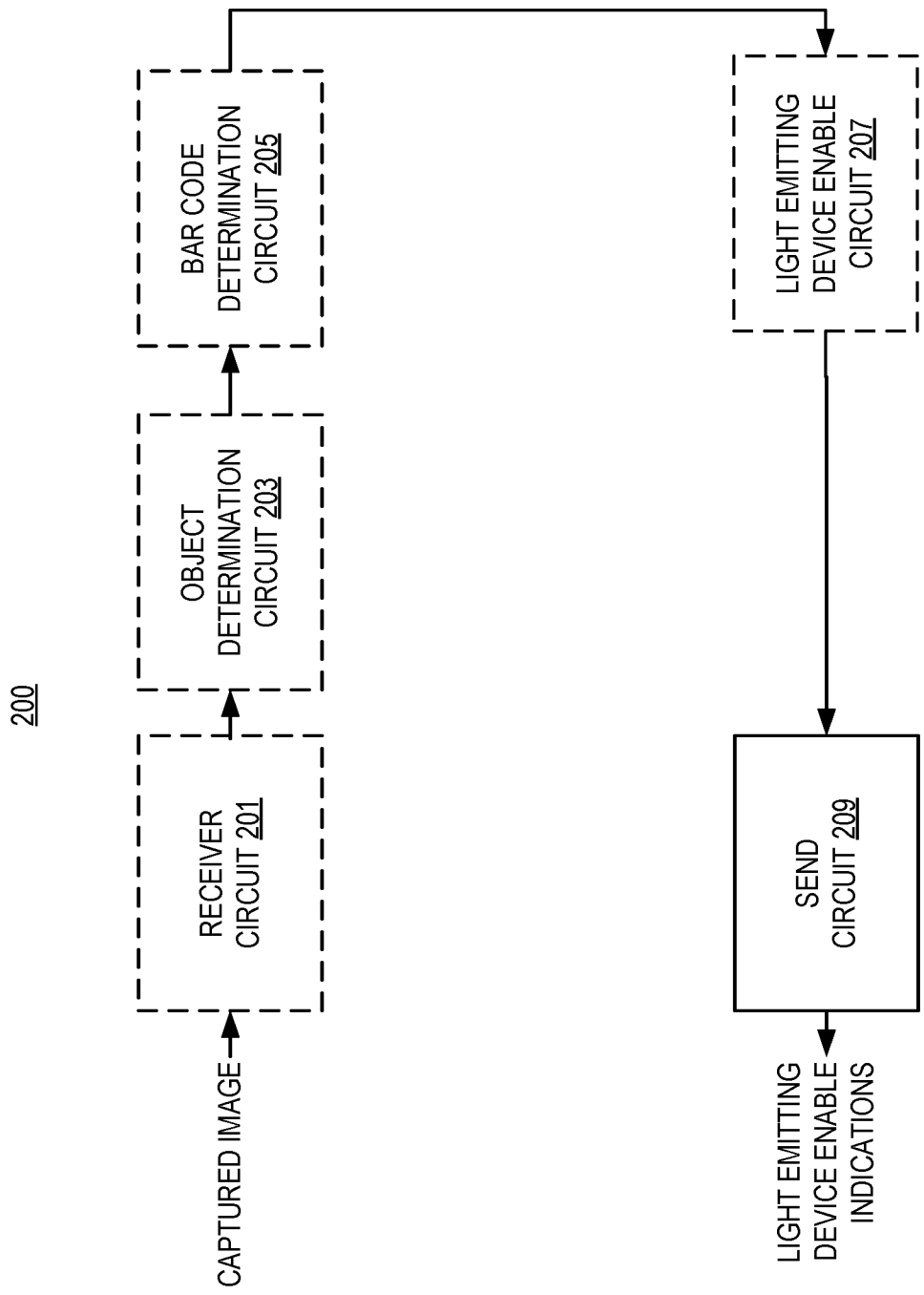
FIG. 2 illustrates one embodiment of an imaging-based bar code scan device in accordance with various aspects as described herein.

FIG. 2 illustrates one embodiment of an imaging-based bar code scan device 200 in accordance with various aspects as described herein. In FIG. 2, the device 200 implements various functional means, units, or modules (e.g., via the processing circuitry 301a in FIG. 3A, via the processing circuitry 501 in FIG. 5, via software code, or the like), or circuits. In one embodiment, these functional means, units, modules, or circuits (e.g., for implementing the method(s) herein) may include for instance: a receiver circuit 201 operable to receive, from an image sensor an image captured by the image sensor through an optical lens; an object determination circuit 203 operable to determine that the captured image represents an object in a field of view of the optical lens; a bar code determination circuit 205 operable to determine that the detected object includes a bar code based on the captured image; a light emitting element enable determination circuit 207 operable to determine to enable each light emitting element responsive to determining that the captured image represents an object or determining that a detected object includes a bar code; and a send circuit 209 operable to send, to each light emitting element, an indication to enable that light emitting element to project a light beam towards the optical axis in the focused region so that the light beams overlap when a target bar code is in the focused region and the light beams non-overlap when a target bar code is outside the focused region.

Figures 3A, 3B:
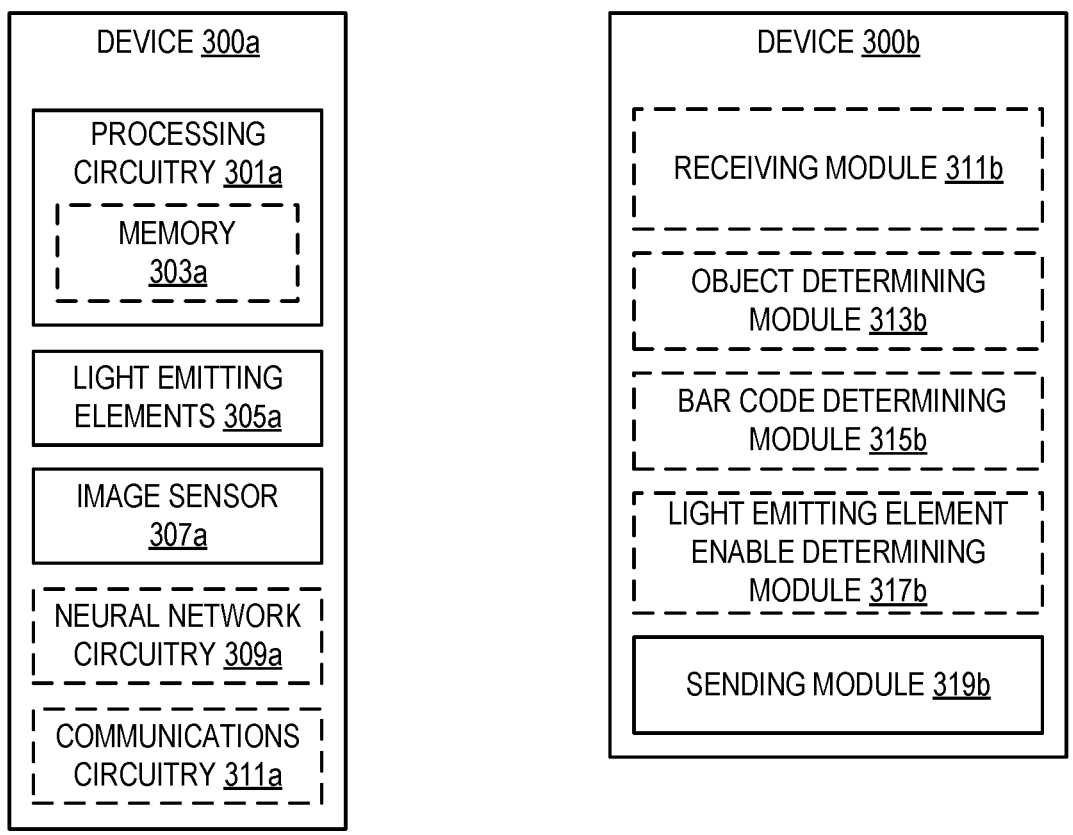
FIGS. 3A-B illustrate other embodiments of an imaging-based bar code scan device in accordance with various aspects as described herein.

FIGS. 3A-B illustrate other embodiments of an imaging-based bar code scan device 300a-b in accordance with various aspects as described herein. In FIG. 3A, the device 300a may include processing circuitry 301a that is operably coupled to one or more of the following: memory 303a, light emitting elements 305a, an image sensor 307a, neural network circuitry 309a, communications circuitry 311a, the like, or any combination thereof. The communication circuitry 311a is configured to transmit and/or receive information to and/or from one or more other nodes via any communication technology. The processing circuitry 301a is configured to perform processing described herein, such as by executing instructions stored in memory 303a. The processing circuitry 303a in this regard may implement certain functional means, units, or modules. The light emitting elements 305a are configured to project light beams towards the optical axis in the focused region of an optical lens so that the light beams overlap when a target bar code is in the focused region and the light beams non-overlap when a target bar code is outside the focused region. The image sensor 307a is configured to detect and convey information used to make an image. The neural network circuitry 309a is configured to reflect the behavior of the human brain allowing the neural network circuitry 309a to recognize patterns and solve common problems in the fields of artificial intelligence (AI), machine learning, and deep learning. In one example, the neural network circuitry 309a can be configured as a convolutional neural network (CNN) to analyze images and perform image classification such as detecting objects, bar codes, shapes, colors, or the like.

Figure 5:
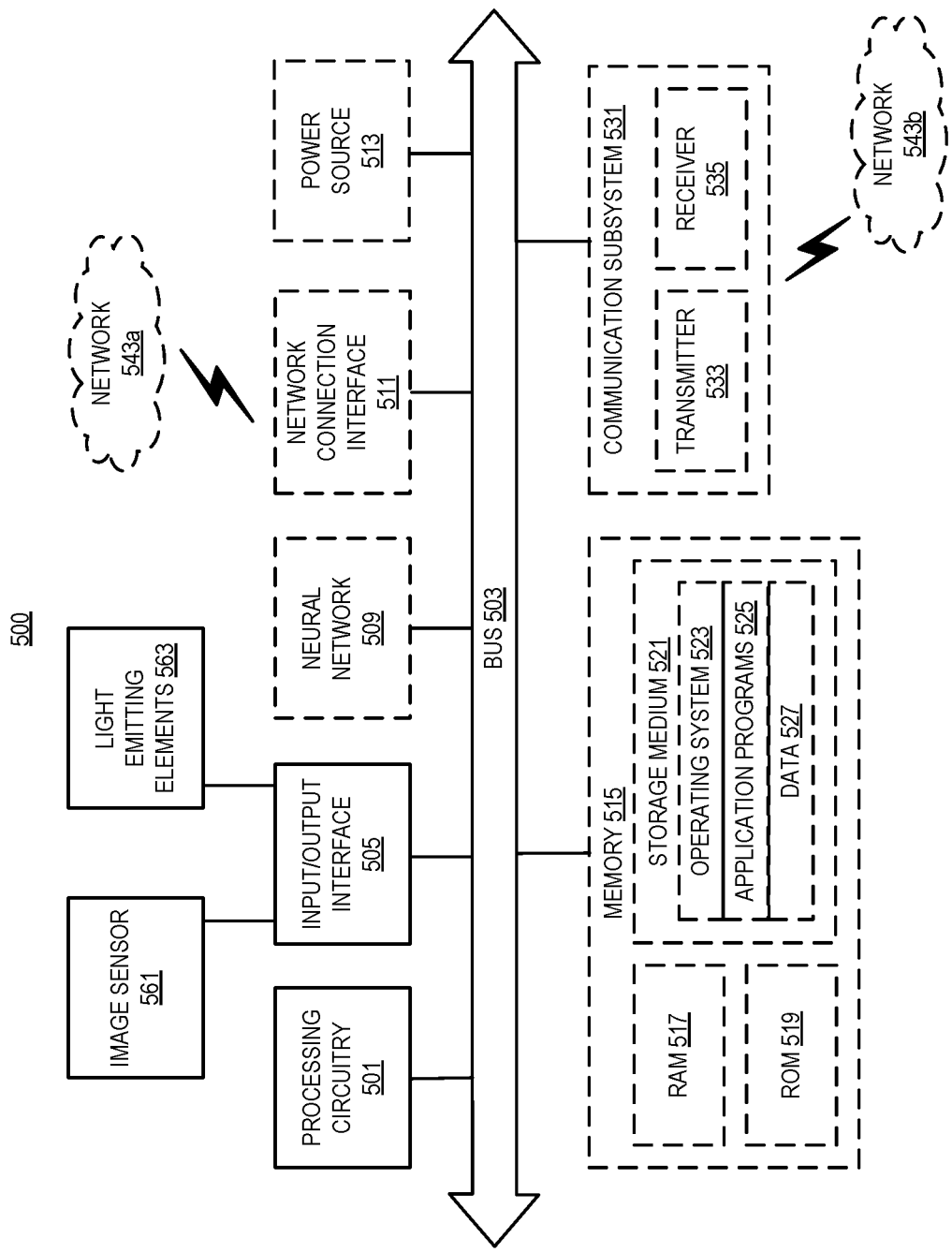
FIG. 5 illustrates another embodiment of an imaging-based bar code scan device in accordance with various aspects as described herein.

In FIG. 3B, the device 300b implements various functional means, units, or modules (e.g., via the processing circuitry 301a in FIG. 3A, via the processing circuitry 501 in FIG. 5, via software code, or the like). In one embodiment, these functional means, units, or modules (e.g., for implementing the method(s) described herein) may include for instance: a receiving module 311b for receiving, from an image sensor, an image captured by the image sensor through a lens; an object determining module 313b for determining that the captured image represents an object in a field of view of the optical lens; a bar code determining module 315b for determining that the detected object includes a bar code based on the captured image; a light emitting element enable determining module 317b for determining to enable each light emitting element responsive to determining that the captured image represents an object and/or determining that a detected object includes a bar code; and a sending module 319b for sending, to each light emitting element, an indication to enable that light emitting element to project a light beam towards the optical axis in the focused region so that the light beams overlap when a target bar code is in the focused region and the light beams non-overlap when a target bar code is outside the focused region.

Figure 4:
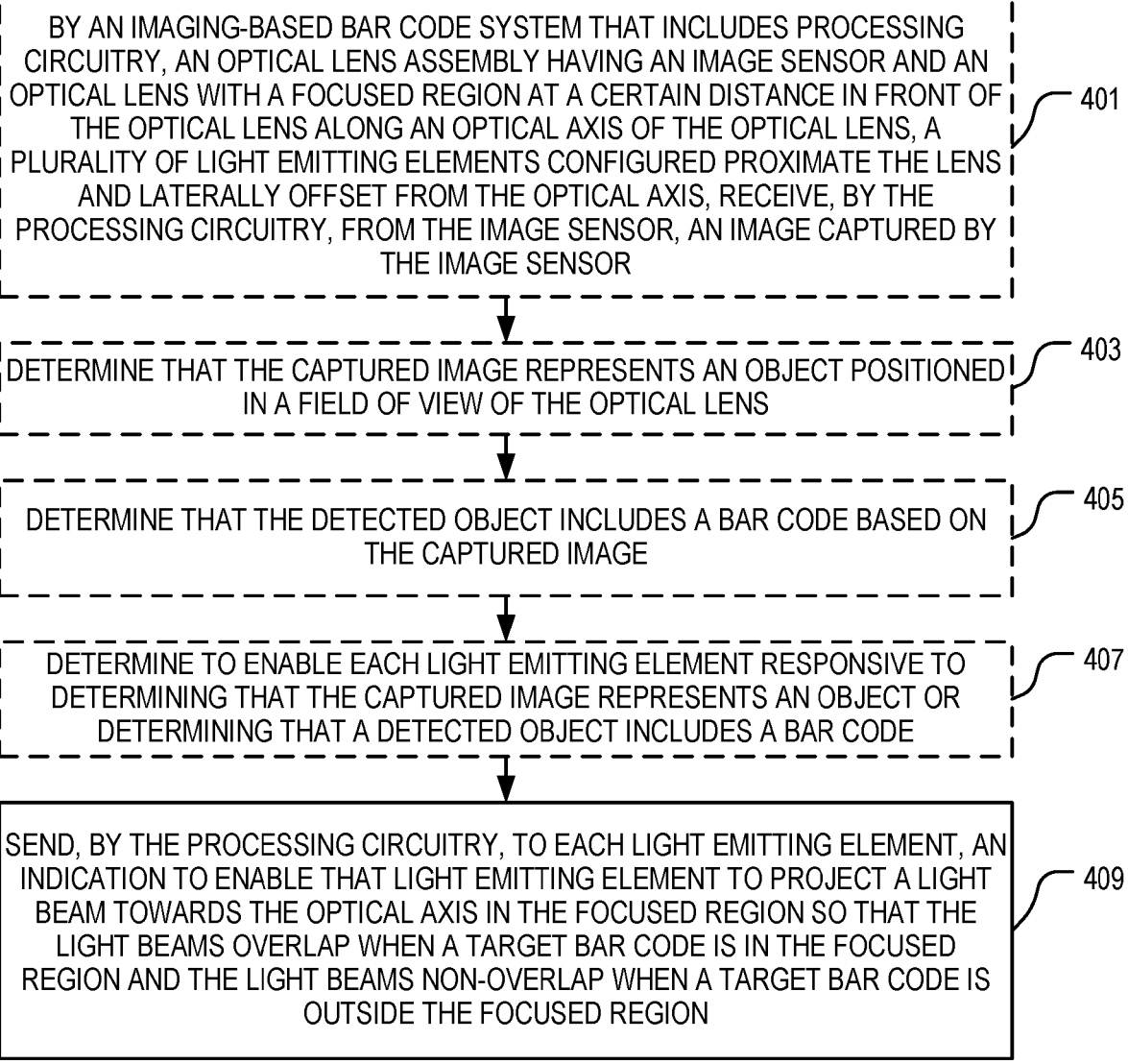
FIG. 4 illustrates one embodiment of a method of conducting a bar code scan using an imaging-based bar code scan device in accordance with various aspects as described herein.

FIG. 4 illustrates one embodiment of a method 400 of conducting a bar code scan using an imaging-based bar code scan device 101, 200, 300a-b, 500 in accordance with various aspects as described herein. In FIG. 4, the method 400 may start, for instance, at block 401 where it may include receiving, by processing circuitry, from an image sensor, an image captured by the image sensor. At block 403, the method 400 may include determining that the captured image represents an object positioned in a field of view of the optical lens. At block 405, the method 400 may include determining that the detected object includes a bar code based on the captured image. At block 407, the method 400 may include determining to enable each light emitting element responsive to determining that the captured image represents an object and/or determining that the detected object includes a bar code. In response to determining to enable each light emitting element, the method 400 includes sending, by the processing circuitry, to each light emitting element, an indication to enable that light emitting element to project a light beam towards the optical axis in the focused region so that the light beams overlap when a target bar code is in the focused region and the light beams non-overlap when a target bar code is outside the focused region, as represented by block 409.

FIG. 5 illustrates another embodiment of an imaging-based bar code scan device 500 in accordance with various aspects as described herein. In FIG. 5, device 500 includes processing circuitry 501 that is operatively coupled to input/output interface 505, neural network circuit 509, network connection interface 511, memory 515 including random access memory (RAM) 517, read-only memory (ROM) 519, and storage medium 521 or the like, communication subsystem 531, power source 533, and/or any other component, or any combination thereof. Storage medium 521 includes operating system 523, application program 525, and data 527. In other embodiments, storage medium 521 may include other similar types of information. Certain devices may utilize all of the components shown in FIG. 5, or only a subset of the components. The level of integration between the components may vary from one device to another device.

Further, certain devices may contain multiple instances of a component, such as multiple processors, memories, neural networks, network connection interfaces, transceivers, etc.

In FIG. 5, processing circuitry 501 may be configured to process computer instructions and data. Processing circuitry 501 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 501 may include two central processing units (CPUs). Data may be information in a form suitable for use by a computer.

In the depicted embodiment, input/output interface 505 may be configured to provide a communication interface to an input device, output device, or input and output device. The device 500 may be configured to use an output device via input/output interface 505. An output device may use the same type of interface port as an input device. For example, a USB port may be used to provide input to and output from the device 500. The output device may be a speaker, a sound card, a video card, a display, a monitor, a printer, an actuator, an emitter, a smartcard, a light emitting element 563, another output device, or any combination thereof. For example, the output device may be a plurality of light emitting elements 563. The device 500 may be configured to use an input device via input/output interface 505 to allow a user to capture information into the device 500. The input device may include a touch-sensitive or presence-sensitive display, an image sensor 561, (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical or image sensor, an infrared sensor, a proximity sensor, another like sensor, or any combination thereof. For example, the input device may be an image sensor 561.

In FIG. 5, the neural network 509 may be configured to learn to perform tasks by considering examples. In one example, the neural network 509 may learn to identify images that contain objects or objects that include bar codes. Further, the neural network 509 may learn to identify a certain shape (e.g., '+', '>', or the like) or a certain color (e.g., green) of any overlapped light beams projected by the light emitting elements 563 on a bar code in the focused region. In response to detecting this certain shape or color, the processing circuitry 501 may decode the captured bar code. The network connection interface 511 may be configured to provide a communication interface to network 543a. The network 543a may encompass wired and/or wireless networks such as a local-area network (LAN), a wide-area network (WAN), a computer network, a wireless network, a telecommunications network, another like network or any combination thereof. For example, network 543a may comprise a Wi-Fi network. The network connection interface 511 may be configured to include a receiver and a transmitter interface used to communicate with one or more other devices over a communication network according to one or more communication protocols, such as Ethernet, TCP/IP, SONET, ATM, or the like. The network connection interface 511 may implement receiver and transmitter functionality appropriate to the communication network links (e.g., optical, electrical, and the like). The transmitter and receiver functions may share circuit components, software or firmware, or alternatively may be implemented separately.

The RAM 517 may be configured to interface via a bus 503 to the processing circuitry 501 to provide storage or caching of data or computer instructions during the execution of software programs such as the operating system, application programs, and device drivers. The ROM 519 may be configured to provide computer instructions or data to processing circuitry 501. For example, the ROM 519 may be configured to store invariant low-level system code or data for basic system functions such as basic input and output (I/O), startup, or reception of keystrokes from a keyboard that are stored in a non-volatile memory. The storage medium 521 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, the storage medium 521 may be configured to include an operating system 523, an application program 525 such as bar code decoder, a widget or gadget engine or another application, and a data file 527. The storage medium 521 may store, for use by the device 500, any of a variety of various operating systems or combinations of operating systems.

The storage medium 521 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. The storage medium 521 may allow the device 500 to access computer-executable instructions, application programs or the like, stored on transitory or non-transitory memory media, to off-load data, or to upload data. An article of manufacture, such as one utilizing a communication system may be tangibly embodied in the storage medium 521, which may comprise a device readable medium.

In FIG. 5, the processing circuitry 501 may be configured to communicate with network 543b using the communication subsystem 531. The network 543a and the network 543b may be the same network or networks or different network or networks. The communication subsystem 531 may be configured to include one or more transceivers used to communicate with the network 543b. For example, the communication subsystem 531 may be configured to include one or more transceivers used to communicate with one or more remote transceivers of another device capable of wireless communication according to one or more communication protocols, such as IEEE 802.11, CDMA, WCDMA, GSM, LTE, UTRAN, WiMax, or the like. Each transceiver may include transmitter 533 and/or receiver 535 to implement transmitter or receiver functionality, respectively, appropriate to the RAN links (e.g., frequency allocations and the like). Further, transmitter 533 and receiver 535 of each transceiver may share circuit components, software or firmware, or alternatively may be implemented separately.

In the illustrated embodiment, the communication functions of the communication subsystem 531 may include data communication, voice communication, multimedia communication, short-range communications such as Bluetooth, near-field communication, location-based communication such as the use of the global positioning system (GPS) to determine a location, another like communication function, or any combination thereof. For example, the communication subsystem 531 may include cellular communication, Wi-Fi communication, Bluetooth communication, and GPS communication. The network 543b may encompass wired and/or wireless networks such as a local-area network (LAN), a wide-area network (WAN), a computer network, a wireless network, a telecommunications network, another like network or any combination thereof. For example, the network 543b may be a cellular network, a Wi-Fi network, and/or a near-field network. The power source 513 may be configured to provide alternating current (AC) or direct current (DC) power to components of the device 500.

The features, benefits and/or functions described herein may be implemented in one of the components of the device 500 or partitioned across multiple components of the device 500. Further, the features, benefits, and/or functions described herein may be implemented in any combination of hardware, software or firmware. In one example, communication subsystem 531 may be configured to include any of the components described herein. Further, the processing circuitry 501 may be configured to communicate with any of such components over the bus 503. In another example, any of such components may be represented by program instructions stored in memory that when executed by the processing circuitry 501 perform the corresponding functions described herein. In another example, the functionality of any of such components may be partitioned between the processing circuitry 501 and the communication subsystem 531. In another example, the non-computationally intensive functions of any of such components may be implemented in software or firmware and the computationally intensive functions may be implemented in hardware.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Additional embodiments will now be described. At least some of these embodiments may be described as applicable in certain contexts for illustrative purposes, but the embodiments are similarly applicable in other contexts not explicitly described.

In one embodiment, an imaging-based bar code scan device includes two aiming LED lights emitting out of the scanner lens. If the bar code is not presented in the focus range of the camera, the lights emitted from the LEDs will be illuminated on the bar code as two non-overlapping dots. The two non-overlapping dots indicate to a user of the device that the bar code is not properly positioned relative to the device so that the bar code should not be scanned and decoded. However, if the bar code is presented in the focus range, the lights will be illuminated on the bar code as two overlapping dots. The two overlapping dots indicate to a user of the device that the bar code is properly positioned relative to the device so that the bar code can be scanned and decoded.

The previous detailed description is merely illustrative in nature and is not intended to limit the present disclosure, or the application and uses of the present disclosure. Furthermore, there is no intention to be bound by any expressed or implied theory presented in the preceding field of use, background, summary, or detailed description. The present disclosure provides various examples, embodiments and the like, which may be described herein in terms of functional or logical block elements. The various aspects described herein are presented as methods, devices (or apparatus), systems, or articles of manufacture that may include a number of components, elements, members, modules, nodes, peripherals, or the like. Further, these methods, devices, systems, or articles of manufacture may include or not include additional components, elements, members, modules, nodes, peripherals, or the like.

Furthermore, the various aspects described herein may be implemented using standard programming or engineering techniques to produce software, firmware, hardware (e.g., circuits), or any combination thereof to control a computing device to implement the disclosed subject matter. It will be appreciated that some embodiments may be comprised of one or more generic or specialized processors such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the methods, devices and systems described herein. Alternatively, some or all functions could be implemented by a state machine that has no stored program instructions, or in one or more application specific integrated circuits (ASICs), in which each function or some combinations of certain of the functions are implemented as custom logic circuits. Of course, a combination of the two approaches may be used. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The term "article of manufacture" as used herein is intended to encompass a computer program accessible from any computing device, carrier, or media. For example, a computer-readable medium may include: a magnetic storage device such as a hard disk, a floppy disk or a magnetic strip; an optical disk such as a compact disk (CD) or digital versatile disk (DVD); a smart card; and a flash memory device such as a card, stick or key drive. Additionally, it should be appreciated that a carrier wave may be employed to carry computer-readable electronic data including those used in transmitting and receiving electronic data such as electronic mail (e-mail) or in accessing a computer network such as the Internet or a local area network (LAN). Of course, a person of ordinary skill in the art will recognize many modifications may be made to this configuration without departing from the scope or spirit of the subject matter of this disclosure.

Throughout the specification and the embodiments, the following terms take at least the meanings explicitly associated herein, unless the context clearly dictates otherwise. Relational terms such as "first" and "second," and the like may be used solely to distinguish one entity or action from another entity or action without necessarily requiring or implying any actual such relationship or order between such entities or actions. The term "or" is intended to mean an inclusive "or" unless specified otherwise or clear from the context to be directed to an exclusive form. Further, the terms "a," "an," and "the" are intended to mean one or more unless specified otherwise or clear from the context to be directed to a singular form. The term "include" and its various forms are intended to mean including but not limited to. References to "one embodiment," "an embodiment," "example embodiment," "various embodiments," and other like terms indicate that the embodiments of the disclosed technology so described may include a particular function, feature, structure, or characteristic, but not every embodiment necessarily includes the particular function, feature, structure, or characteristic. Further, repeated use of the phrase "in one embodiment" does not necessarily refer to the same embodiment, although it may. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. A device or structure that is "configured" in a certain way is configured in at least that way, but may also be configured in ways that are not listed.

What is claimed is:

1. A method, comprising:
    by an imaging-based bar code device that includes processing circuitry, an optical lens assembly having an image sensor and an optical lens with a focused region at a certain distance in front of the optical lens along an optical axis of the optical lens, a plurality of light emitting elements configured proximate the optical lens and laterally offset from the optical axis,
    sending, by the processing circuitry, to each light emitting element, an indication to enable that light emitting element to project a light beam towards the optical axis in the focused region so that the light beams displayed on a surface of a target bar code overlap when the target bar code is in the focused region and non-overlap when the target bar code is behind the focused region along the optical axis.
2. The method of claim 1, wherein the sending is responsive to determining that an image captured by the image sensor through the optical lens includes an object positioned in a field of view of the optical lens.
3. The method of claim 2, wherein the sending is responsive to determining that the object includes a barcode based on the captured image.
4. The method of claim 2, further comprising:
    receiving, by the processing circuitry, from the image sensor, the image captured by the image sensor through the optical lens.
5. The method of claim 1, wherein an angle of the light beam projected by each light emitting element relative to the optical axis is based on a length of the focused region of the lens along the optical axis and a length between the focused region and the lens along the optical axis.
6. The method of claim 1, wherein the lateral distance of each light emitting element relative to the optical axis is based on a length of the focused region of the lens along the optical axis and a length between the focused region and the lens along the optical axis.
7. The method of claim 1, wherein a luminosity of the light beam of each light emitting element in the focused region is the same.
8. The method of claim 1, wherein a distance between the light beam projections displayed on the bar code corresponds to a distance between a current position of the bar code and the focused region along the optical axis.
9. The method of claim 1, wherein the lens is configured as a fixed-focused lens.
10. The method of claim 1, wherein a transverse cross section of the light beam of each light emitting element in the focused region is different.
11. An imaging-based bar code scan device, comprising:
    an optical lens assembly having an image sensor and an optical lens configured with a focused region at a certain distance in front of the optical lens along an optical axis of the optical lens, a plurality of light emitting elements configured proximate the optical lens and laterally offset from the optical axis, processing circuitry and a memory, the memory comprising instructions executable by the processing circuitry whereby the processing circuitry is configured to:
        send, to each light emitting element, an indication to enable that light emitting element to project a light beam towards the optical axis in the focused region so that the light beams displayed on a surface of a target bar code overlap when the target bar code is in the focused region and non-overlap when the target bar code is behind the focused region along the optical axis.
12. The device of claim 11, wherein the processing circuitry is further configured to determine that an image captured by an image sensor through the optical lens includes an object positioned in a field of view of the optical lens; and
    wherein the sending is responsive to the determining that the image includes the object.
13. The device of claim 12, wherein the processing circuitry is further configured to determine that the object includes a barcode based on the captured image; and
    wherein the sending is responsive to the determining that the object includes the barcode.
14. The device of claim 12, wherein the processing circuitry is further configured to receive, from the image sensor, the image captured by the image sensor through the optical lens.
15. The device of claim 11, wherein an angle of the light beam projected by each light emitting element relative to the optical axis is based on a length of the focused region of the lens along the optical axis and a length between the focused region and the lens along the optical axis.
16. The device of claim 11, wherein the lateral distance of each light emitting element relative to the optical axis is based on a length of the focused region of the lens along the optical axis and a length between the focused region and the lens along the optical axis.

17. The device of claim 11, wherein a luminosity of the light beam of each light emitting element in the focused region is the same.

18. The device of claim 11, wherein a distance between the light beam projections displayed on the bar code corresponds to a distance between a current position of the bar code and the focused region along the optical axis.

19. The device of claim 11, wherein the lens is configured as a fixed-focused lens.

20. The device of claim 11, wherein a transverse cross section of the light beam of each light emitting element in the focused region is different.

* * * * *